US 8,789,364 B2

(12) United States Patent
Huen et al.

(10) Patent No.: US 8,789,364 B2
(45) Date of Patent: Jul. 29, 2014

(54) VACUUM ASSIST PUMP SYSTEM

(76) Inventors: Waikei Huen, Macau (CN); Yun Li, Macau (CN)

( * ) Notice: Subject to any disclaimer, the term of this patent is extended or adjusted under 35 U.S.C. 154(b) by 1596 days.

(21) Appl. No.: 12/296,995

(22) PCT Filed: Apr. 14, 2006

(86) PCT No.: PCT/CN2006/000686
§ 371 (c)(1),
(2), (4) Date: Aug. 26, 2010

(87) PCT Pub. No.: WO2007/118353
PCT Pub. Date: Oct. 25, 2007

(65) Prior Publication Data
US 2010/0313975 A1 Dec. 16, 2010

(51) Int. Cl.
*B60T 13/46* (2006.01)
*B60T 17/02* (2006.01)
*B60T 13/52* (2006.01)

(52) U.S. Cl.
CPC *B60T 13/52* (2013.01); *B60T 17/02* (2013.01)
USPC .............................................. 60/397; 60/582

(58) Field of Classification Search
USPC .......................................... 60/397, 405, 582
See application file for complete search history.

(56) References Cited

U.S. PATENT DOCUMENTS

| 5,515,676 | A | 5/1996 | Earle |
| 6,324,845 | B1 * | 12/2001 | Fulks et al. ............ 60/582 |
| 6,443,535 | B1 * | 9/2002 | Crombez et al. ............ 60/397 |
| 2003/0006891 | A1 | 1/2003 | Wild et al. |
| 2005/0000769 | A1 | 1/2005 | Hawener et al. |

FOREIGN PATENT DOCUMENTS

| CN | ZL 02282639.4 | 10/2003 |
| CN | 2759873 Y | 2/2006 |
| CN | 1923585 A | 3/2007 |
| DE | 3203400 A1 | 8/1983 |
| EP | 0 999 109 A2 | 5/2000 |
| EP | 999109 A2 * | 5/2000 |
| JP | 59-190446 A | 10/1984 |
| JP | 10-175463 A | 6/1998 |
| JP | 11-139302 A | 5/1999 |
| JP | 2001-055133 A | 2/2001 |
| JP | 2001-080497 A | 3/2001 |
| JP | 2001-199326 A | 7/2001 |
| JP | 2001-301606 A | 10/2001 |
| JP | 2003-312469 A | 11/2003 |
| KR | 1020050057898 | 6/2005 |

OTHER PUBLICATIONS

EP Search Report for EP 06 72 2335 dated Jun. 15, 2012.

(Continued)

*Primary Examiner* — Thomas E Lazo
(74) *Attorney, Agent, or Firm* — Alston & Bird LLP

(57) ABSTRACT

A vacuum assist pump system includes a vacuum assist pump for assisting to a brake system by vacuum, wherein it includes a suction compensation pump connected with the vacuum assist pump. Advantageously, a vacuum compensation reservoir is arranged between the vacuum assist pump and the suction compensation pump. The vacuum compensation reservoir comprises a vacuity sensor for its internal vacuity and two interfaces. One of the two interfaces communicates to the suction compensation pump, the other communicates to the vacuum assist pump.

12 Claims, 2 Drawing Sheets

(56) References Cited

OTHER PUBLICATIONS

International Searching Authority, International Search Report for International Application No. PCT/CN2006/000686, Jan. 25, 2007, 4 pages, SIPO, China.

The International Bureau of WIPO, International Preliminary Report on Patentability (translation of ISA's Dec. 27, 2006 Written Opinion) for International Application No. PCT/CN2006/000686, Feb. 17, 2009, Switzerland.

The Federal Institute for Intellectual Property, Office Action for Russian Application No. 2008144955/11, Feb. 2, 2010, 5 pages, Russia.

Japan Patent Office, Office Action for Application No. 2009-504549, Nov. 22, 2011, 3 pages, Japan.

State Intellectual Property Office of the P.R.C., Office Action for Application No. 200680054204.7, Jan. 18, 2011, 5 pages, China.

Korean Intellectual Property Office, Office Action for Application No. 10-2008-7027690, Aug. 1, 2012, 7 pages, Republic of Korea.

* cited by examiner

VACUUM ASSIST PUMP SYSTEM

TECHNICAL FIELD OF THE INVENTION

The present invention relates to a vacuum assist pump system for a motor vehicle.

BACKGROUND OF THE INVENTION

Vacuum assist pumps are provided for assist brake in most cars and light vehicles, in which the magnitude of brake power assist generated by the vacuum assist pump has close relation to the rotation speed of an engine. When a brake pedal is pressed down, a diaphragm within the vacuum assist bump is drawn by means of the engine's air suction so that one push rod is caused to engage on the brake pump, and thus the braking force increases.

It is known from the Chinese patent ZL02 2 82639.4 a coasting control device for a vehicle adopting an overrunning clutch. Its principle is as follows: when the vehicle decelerates, it is out of the engine damping via overrunning clutch in order to coast a longer distance without the engine damping, and thus the purpose for saving fuel is attained. However, there is a serious safety problem in this technical scheme, because the vehicle is nothing more than in the neutral coasting state as the coasting control device is operated and the suction ability is very low as the engine runs in idling state, so that the vacuum assist bump can not reach its expected brake power assist, and the braking performance decreases, which is not allowable in the vehicle driving criterion and the vehicle manufacture criterion.

SUMMARY OF THE INVENTION

The present invention has an object to provide a vacuum assist pump system for a vehicle. This system can ensure the motor vehicle safety during emergency braking in high speed running conditions and implements fuel saving effects of the prior art described above simultaneously.

In order to achieve this object described above, a vacuum assist pump system according to the present invention includes a vacuum assist pump for providing vacuum power assist for a brake system, characterized in that it includes a suction compensation pump connected with the vacuum assist pump. When a driver operates the brake pedal for emergency braking, the suction compensation pump begins to work immediately for compensating the suction shortage caused by the idle motion of the engine. But in the case of suction compensating pump connected directly to the vacuum assist pump, the suction compensation pump can compensate the lost portion of the vacuum assist pump only in the case where the power of the suction compensation pump is required highly.

According to a preferred scheme of the present invention, between the vacuum assist pump and the suction compensation pump a vacuum compensation reservoir is arranged, which comprises a vacuity sensor for sensing its internal vacuum degree and two interfaces, one of which leads to the suction compensation pump, and the other leads to the vacuum assist pump through a control switch valve. The control switch valve is, for example, an electromagnetic valve for controlling the switching-on and the switching-off of the air path.

In the improved scheme, the suction compensation pump preferably operates as follows, that is to say, when the vacuum degree detected by the vacuity sensor is not sufficient, the suction compensation pump vacuumizes the vacuum compensation reservoir continuously until the vacuum degree in the vacuum compensation reservoir reaches a predetermined vacuum degree. Because what is contained in the vacuum compensation reservoir is gas, the shape of the vacuum compensation reservoir is not limited substantially and can be such as tube, hexahedron, sphere, and so on.

When the suction compensation pump is connected directly with the vacuum compensation pump, the suction compensation pump is so linked to a vacuum control valve arranged in the vacuum assist pump, that when the vacuum control valve is fully closed, the suction compensation pump begins to work for suctioning air from the vacuum assist pump and when the vacuum control valve is not fully closed, the suction compensation pump does not work.

In the case of a vacuum compensation pump connected medially, the control switch valve is so linked to a vacuum control valve arranged in the vacuum assist pump, that when the vacuum control valve is fully closed, the control switch valve is opened for power assist compensation to the vacuum assist pump, and when the vacuum control valve is not fully closed, the control switch valve is in a closed state without power assist compensation to the vacuum assist pump.

Operation parameters of the vacuum assist pump in various kinds of motor vehicles are not identical with each other, wherein the volume of pump chamber and the vacuum degree of pump chamber are mainly parameters used to design the vacuum compensation reservoir and the suction compensation pump. Under ideal conditions, the design of vacuum compensation reservoir and suction compensation pump can just compensate the shortage of vacuum degree in the vacuum assist pump caused by the idle motion of the engine. Generally, the power assist compensation quantity of the vacuum assist pump compensated by the vacuum compensation reservoir is not less than the decrease of the power assist in the vacuum assist pump caused by the idle motion of the engine.

The design of the vacuum compensation reservoir is mainly the design of its volume and vacuum. The volume of vacuum compensation reservoir and the vacuum degree in the reservoir can affect the power assist compensation. As the volume is larger, the power assist compensation is larger accordingly. As the vacuum degree in the reservoir is larger, the power assist compensation is larger; the power assist compensation is smaller inversely. The vacuum compensation reservoir acts as an accumulator, so a suction compensation pump with small power can be adopted in the case of medially connected with the vacuum compensation reservoir. Parameters of the suction compensation pump, such as flow, maximum suction vacuum degree and power, are selected depending on the design volume and design vacuum degree of the vacuum compensation reservoir so as to meet the design demand on the vacuum compensation reservoir. The power of the suction compensation pump should be selected for producing a predetermined vacuum degree in the vacuum compensation reservoir in a certain time. Generally, said time is not more than 10 seconds, preferably not more than 5 seconds.

With respect to various type of motor vehicle, demand on power assist compensation for a vacuum assist pump, which is required by a vacuum compensation reservoir, is different. The volume and the vacuum degree of the vacuum compensation reservoir are designed according to the demand on pump chamber volume and/or vacuum degree of the vacuum assist pump. In a simplest way, in the tests and/or software simulations in term of a real motor vehicle mounted with the vacuum assist pump system of the present invention, according to the brake effects of the motor vehicle mounted with the vacuum assist pump system of the present invention, for example, according to the air quantity sucked out from the vacuum assist pump system and the variations of the vacuum degree in the vacuum assist pump during the sucking process and the power assist generated correspondingly, or for example, according to the force acting on the push rod, an optimized combination is selected from various combinations combined by a series of vacuum compensation reservoir volumes and a series of vacuum compensation reservoir vacuum degrees. All in all, the volume and vacuum degree of the vacuum compensation reservoir are designed according to the requirements for power assist of the vacuum assist pump in principle.

BRIEF DESCRIPTION OF THE DRAWINGS

The present invention will be embodied hereinafter by referring to the following figures. Wherein.

DETAILED DESCRIPTION OF THE EMBODIMENTS

Figure 1:
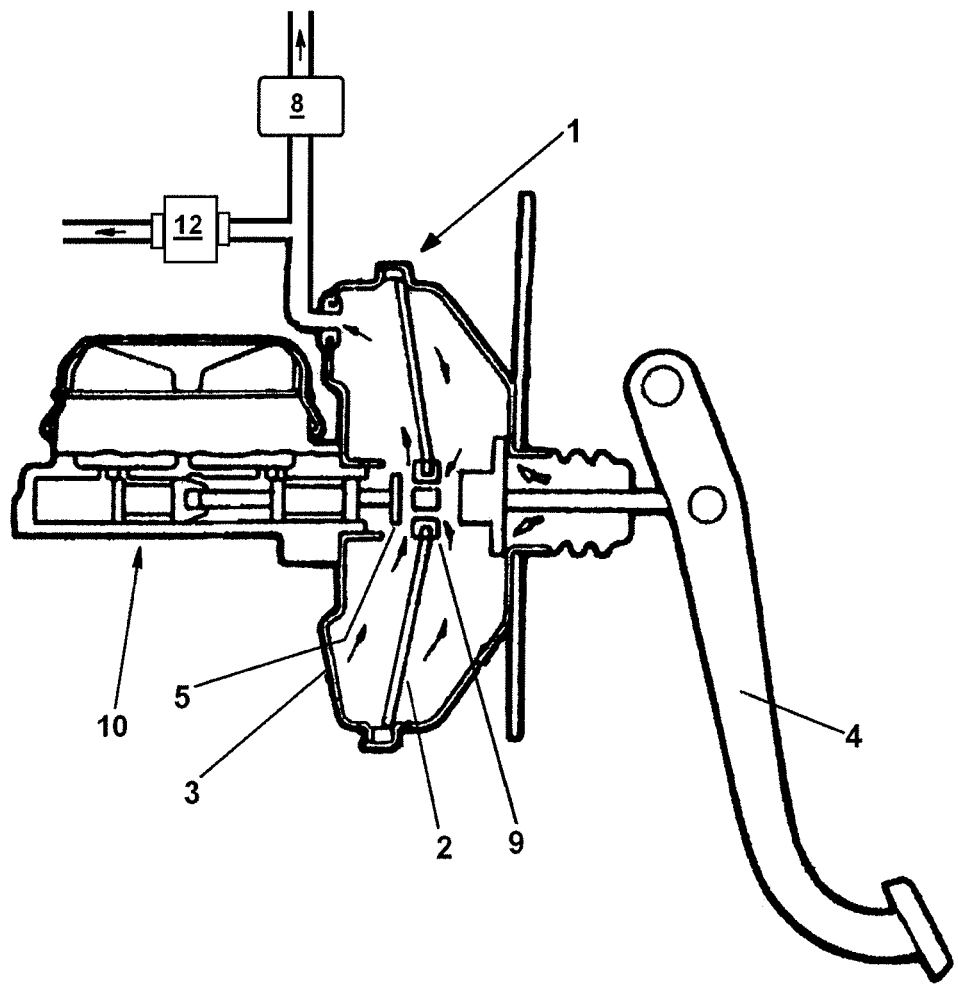
FIG. 1 shows a diagrammatic view of one embodiment of the vacuum assist pump system according to the present invention.

FIG. 1 shows a diagrammatic view of one embodiment of the vacuum assist pump system according to the present invention. This vacuum assist pump system includes a vacuum assist pump 1 and a suction compensation pump 8. The vacuum assist pump 1 basically includes a diaphragm 2, a vacuum control valve 9 and a housing 3. When the brake pedal 4 is not operated, the vacuum control valve 9 is fully open, and no difference of vacuum degree exists between both sides of the diaphragm. When a brake pedal 4 is operated, the vacuum control valve 9 is closed gradually, and the chamber on the left side of diaphragm 2 is vacuumized gradually so that the diaphragm 2 moves towards a push rod 5 for implementing vacuum power assist for a brake pump 10. Seen from the FIG. 1, an air suction loop derived from the vacuum side of the vacuum assist pump 1 is branched into two branch paths, one of which leads to an engine via a check valve 12, the other leads to the suction compensation pump 8. The check valve 12 prevents the airflow in the suction pipe of the engine from returning to the air path of the suction compensation pump 8 during emergency braking, which is finally a disadvantage to the power assist of the vacuum assist pump 1.

Figure 2:
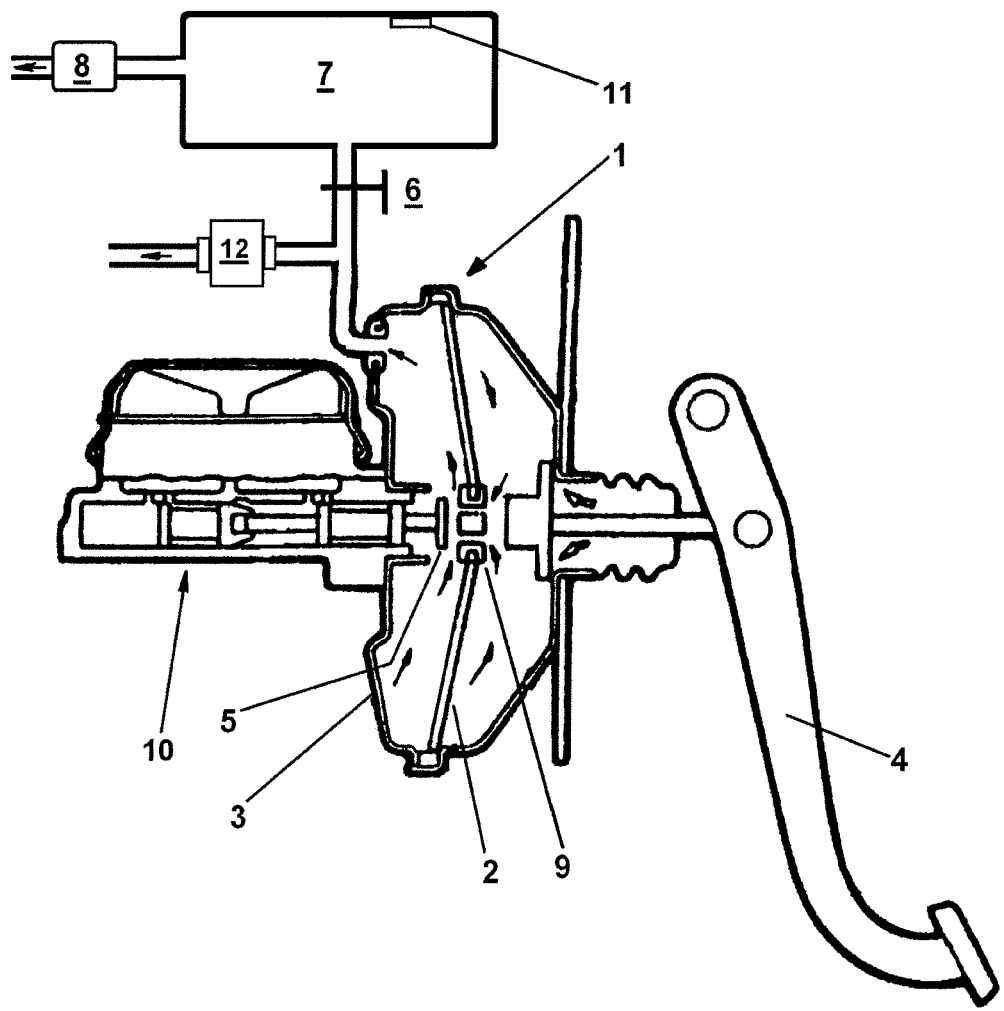
FIG. 2 shows a diagrammatic view of another embodiment of the vacuum assist pump system according to the present invention.

FIG. 2 shows a diagrammatic view of another embodiment of the vacuum assist pump system according to the present invention. This vacuum assist pump system includes a vacuum assist pump 1, a vacuum compensation reservoir 7 and a suction compensation pump 8. The vacuum assist pump 1 basically includes a diaphragm 2, a vacuum control valve 9 and a housing 3. When the brake pedal 4 is not operated, the vacuum control valve 9 is fully open, and no difference of the vacuum degree exists between both sides of the diaphragm. When the brake pedal 4 is operated, the vacuum control valve is 9 closed gradually, the chamber on the left side of diaphragm 2 is vacuumized gradually so that the diaphragm 2 moves towards a push rod 5 for implementing vacuum power assist for the brake pump 10. Seen from the FIG. 2, an air suction loop derived from the vacuum side of the vacuum assist pump 1 is branched into two branch paths, one of which leads to an engine through a check valve 12, the other leads to the vacuum compensation reservoir 7 through a control switch valve 6 and then leads to a suction compensation pump 8. A vacuity sensor 11 is arranged in the vacuum compensation reservoir 7. The check valve 12 prevents the airflow in the suction pipe of the engine from returning to the air path of the vacuum compensation reservoir 7 during emergency braking, which attenuates the power assist compensation ability of the vacuum compensation reservoir 7 and is finally a disadvantage to the power assist of the vacuum assist pump 1.

When starting the engine, in the case where the vacuity sensor 11 arranged in the vacuum compensation reservoir 7 detects the shortage of vacuum degree in the vacuum compensation reservoir 7, the vacuity sensor 11 sends a signal for controlling the suction compensation pump 8 to work so as to vacuumize the vacuum compensation reservoir 7, then the suction compensation pump 8 does not stop working until the vacuum degree in the vacuum compensation reservoir 7 reaches a predetermined vacuum degree.

When a driver presses down the brake pedal 4 during emergency braking, for a motor vehicle adopting overrunning clutches, the suction shortage in the vacuum assist pump 1 is caused by the engine. At this time, the control switch valve 6 is opened, so that the vacuum assist bump 1 is vacuumized by means of the vacuum degree in the vacuum compensation reservoir 7. This is equivalent to add a second suction pipe for the vacuum assist pump 1 for compensating the shortage of air suction generated by the original suction pipe due to the idle motion of the engine.

The invention claimed is:

1. A vacuum assist pump system comprising:
    a vacuum assist pump for providing vacuum power assist for a brake system, and
    a suction compensation pump connected with the vacuum assist pump, and
    the suction compensation pump is so linked to a vacuum control valve arranged in the vacuum assist pump, that when the vacuum control valve is fully closed, the suction compensation pump begins to work for suctioning air from the vacuum assist pump, and when the vacuum control valve is not fully closed, the suction compensation pump does not work.

2. The vacuum assist pump system according to claim 1, characterized in that between the vacuum assist pump and the suction compensation pump a vacuum compensation reservoir is arranged, which comprises a vacuity sensor for sensing its internal vacuum degree and two interfaces, one of which leads to the suction compensation pump, and the other leads to the vacuum assist pump through a control switch valve.

3. The vacuum assist pump system according to claim 2, characterized in that when the vacuum degree detected by the vacuity sensor is less than a predetermined vacuum degree, the suction compensation pump vacuumizes the vacuum compensation reservoir continuously until the vacuum degree in the vacuum compensation reservoir reaches the predetermined vacuum degree.

4. The vacuum assist pump system according to claim 2, characterized in that the control switch valve is so linked to a vacuum control valve arranged in the vacuum assist pump, that when the vacuum control valve is fully closed, the control switch valve is opened for power assist compensation to the vacuum assist pump, and when the vacuum control valve is not fully closed, the control switch valve is closed without power assist compensation to the vacuum assist pump.

5. The vacuum assist pump system according to claim 2, characterized in that the volume of the vacuum compensation reservoir is designed according to the pump chamber volume of the vacuum assist pump and/or the demand on vacuum degree of the vacuum assist pump.

6. The vacuum assist pump system according to claim 2, characterized in that the vacuum degree in the compensation reservoir is designed according to the pump chamber volume of the vacuum assist pump and/or the demand on vacuum degree of the vacuum assist pump.

7. The vacuum assist pump system according to claim 2, characterized in that the volume and/or the vacuum degree of the vacuum compensation reservoir are selected according to tests and/or software simulations.

8. The vacuum assist pump system according to claim 2, characterized in that the control switch valve is mechanical or electromagnetic.

9. The vacuum assist pump system according to claim 2, characterized in that the power of the suction compensation pump is selected for producing a predetermined vacuum degree in the vacuum compensation reservoir in a certain time.

10. The vacuum assist pump system according to claim 9, characterized in that said time is not more than ten seconds.

11. The vacuum assist pump system according to claim 10, characterized in that said time is not more than five seconds.

12. The vacuum assist pump system according to claim 1, characterized in that a check valve which only allows the airflow sucked in a direction of an engine is arranged in a branch path leading to the engine from the vacuum assist pump.

* * * * *